(12) United States Patent
Hanson et al.

(10) Patent No.: US 6,235,425 B1
(45) Date of Patent: May 22, 2001

(54) APPARATUS AND METHOD FOR TREATING A CATHODE MATERIAL PROVIDED ON A THIN-FILM SUBSTRATE

(75) Inventors: Eric J. Hanson, Hudson, WI (US); Richard L. Kooyer, Hastings, MN (US)

(73) Assignees: 3M Innovative Properties Company, St. Paul, MN (US); Hydro-Quebec, Montreal ( * ) Notice: Subject to any disclaimer, the term of this patent is extended or adjusted under 35 U.S.C. 154(b) by 0 days.

(21) Appl. No.: 08/989,502

(22) Filed: Dec. 12, 1997

(51) Int. Cl.[7] .................................................. H01M 4/02

(52) U.S. Cl. .................... 429/209; 429/162; 429/231.95; 29/623.3; 29/623.5

(58) Field of Search ................................ 429/162, 209, 429/231.95; 29/623.3, 623.5

(56) References Cited

U.S. PATENT DOCUMENTS

| | | |
|---|---|---|
| 2,812,376 | 11/1957 | Yardney . |
| 3,193,412 | 7/1965 | Salkind et al. . |
| 3,390,014 | 6/1968 | Eisler . |
| 3,578,506 | 5/1971 | Chassoux . |
| 3,630,783 | 12/1971 | Przbyla . |
| 3,786,466 | 1/1974 | Naito et al. . |
| 3,793,501 | 2/1974 | Stonestrom . |
| 3,899,355 | 8/1975 | Chiklis . |
| 3,937,635 | 2/1976 | Mead et al. . |
| 4,028,479 | 6/1977 | Fanciullo et al. . |
| 4,060,669 | 11/1977 | Fanciullo . |
| 4,060,670 | 11/1977 | Tamminen . |
| 4,080,728 | 3/1978 | Buckler . |
| 4,091,186 | 5/1978 | Ott et al. . |
| 4,098,965 | 7/1978 | Kinsman . |
| 4,105,807 | 8/1978 | Arora . |
| 4,137,627 | 2/1979 | Kinsman . |
| 4,150,266 | 4/1979 | Patrichi . |
| 4,152,825 | 5/1979 | Bruneau . |
| 4,207,389 | 6/1980 | Gunther et al. . |
| 4,209,479 | 6/1980 | Gunther et al. . |
| 4,233,371 | 11/1980 | Dorrestijn . |
| 4,238,721 | 12/1980 | DeLuca et al. . |
| 4,241,152 | 12/1980 | Klink . |
| 4,303,877 | 12/1981 | Meinhold . |
| 4,321,435 | 3/1982 | Grieger et al. . |
| 4,322,484 | 3/1982 | Sugalski . |

(List continued on next page.)

FOREIGN PATENT DOCUMENTS

| | | |
|---|---|---|
| 3246968 A1 | 7/1984 | (DE) . |
| 4218381 C1 | 5/1993 | (DE) . |

(List continued on next page.)

*Primary Examiner*—Carol Chaney
*Assistant Examiner*—Angela J. Martin
(74) *Attorney, Agent, or Firm*—Altera Law Group LLC (57) ABSTRACT

An apparatus and method for treating a cathode material provided on a surface of a continuous thin-film substrate and a treated thin-film cathode having increased smoothness are disclosed. A web of untreated cathode material is moved between a feed mechanism and a take-up mechanism, and passed through a treatment station. The web of cathode material typically includes areas having surface defects, such as prominences extending from the surface of the cathode material. The surface of the cathode material is treated with an abrasive material to reduce the height of the prominences so as to increase an 85 degree gloss value of the cathode material surface by at least approximately 10. The web of cathode material may be subjected to a subsequent abrasive treatment at the same or other treatment station. Burnishing or lapping film is employed at a treatment station to process the cathode material. An abrasive roller may alternatively be used to process the web of cathode material. The apparatus and method of the present invention may also be employed to treat the surface of a lithium anode foil so as to cleanse and reduce the roughness of the anode foil surface.

14 Claims, 6 Drawing Sheets

U.S. PATENT DOCUMENTS

| | | |
|---|---|---|
| 4,342,978 | 8/1982 | Meister . |
| 4,370,531 | 1/1983 | Tobin . |
| 4,383,013 | 5/1983 | Bindin et al. . |
| 4,409,086 | 10/1983 | Haas et al. . |
| 4,409,538 | 10/1983 | Tabata . |
| 4,429,026 | 1/1984 | Bruder . |
| 4,436,792 | 3/1984 | Tomino et al. . |
| 4,477,545 | 10/1984 | Akridge et al. . |
| 4,479,083 | 10/1984 | Sullivan . |
| 4,490,707 | 12/1984 | O'Leary . |
| 4,495,259 | 1/1985 | Uba . |
| 4,507,857 | 4/1985 | Epstein et al. . |
| 4,517,265 | 5/1985 | Belanger et al. . |
| 4,518,665 | 5/1985 | Fujita et al. . |
| 4,525,439 | 6/1985 | Simonton . |
| 4,547,438 | 10/1985 | McArthur et al. . |
| 4,571,468 | 2/1986 | Weldon . |
| 4,654,278 | 3/1987 | McManis, III et al. . |
| 4,664,993 | 5/1987 | Sturgis et al. . |
| 4,670,703 | 6/1987 | Williams . |
| 4,691,085 | 9/1987 | Swanson . |
| 4,692,577 | 9/1987 | Swanson . |
| 4,707,795 | 11/1987 | Alber et al. . |
| 4,752,540 | 6/1988 | Chua et al. . |
| 4,758,483 | 7/1988 | Armand et al. . |
| 4,816,354 | 3/1989 | Tamminen . |
| 4,824,746 * | 4/1989 | Belanger et al. .................... 429/218 |
| 4,828,939 | 5/1989 | Turley et al. . |
| 4,851,307 | 7/1989 | Armand et al. . |
| 4,852,684 | 8/1989 | Packard . |
| 4,883,726 | 11/1989 | Peled et al. . |
| 4,887,348 | 12/1989 | Tamminen . |
| 4,897,917 | 2/1990 | Gauthier et al. . |
| 4,911,993 | 3/1990 | Turley et al. . |
| 4,913,259 | 4/1990 | Packard . |
| 4,923,582 | 5/1990 | Abrahamson et al. . |
| 4,927,717 | 5/1990 | Turley et al. . |
| 4,961,043 | 10/1990 | Koenck . |
| 4,967,136 | 10/1990 | Nofzinger . |
| 4,971,531 | 11/1990 | Aikioniemi . |
| 4,973,936 | 11/1990 | Dimpault-Darcy et al. . |
| 4,997,732 | 3/1991 | Austin et al. . |
| 5,008,161 | 4/1991 | Johnston . |
| 5,057,385 | 10/1991 | Hope et al. . |
| 5,066,370 | 11/1991 | Andreshak et al. . |
| 5,066,555 | 11/1991 | Tamminen . |
| 5,070,787 | 12/1991 | Weldon et al. . |
| 5,071,652 | 12/1991 | Jones et al. . |
| 5,089,027 | 2/1992 | Rossoll et al. . |
| 5,162,171 | 11/1992 | Jones . |
| 5,180,641 | 1/1993 | Burns et al. . |
| 5,188,869 | 2/1993 | Getz et al. . |
| 5,197,889 | 3/1993 | Rizzo et al. . |
| 5,199,239 | 4/1993 | Younger . |
| 5,204,194 | 4/1993 | Miller et al. . |
| 5,227,259 | 7/1993 | Weaver et al. . |
| 5,227,264 | 7/1993 | Duval et al. . |
| 5,283,512 | 2/1994 | Stadnick et al. . |
| 5,300,373 | 4/1994 | Shackle . |
| 5,313,152 | 5/1994 | Wozniak et al. . |
| 5,324,597 | 6/1994 | Leadbetter et al. . |
| 5,337,042 | 8/1994 | Hormel et al. . |
| 5,346,786 | 9/1994 | Hodgetts . |
| 5,354,630 | 10/1994 | Earl et al. . |
| 5,363,405 | 11/1994 | Hormel . |
| 5,382,480 | 1/1995 | Molyneux . |
| 5,384,212 | 1/1995 | Heiman et al. . |
| 5,385,793 | 1/1995 | Tiedemann et al. . |
| 5,393,617 | 2/1995 | Klein . |
| 5,401,595 | 3/1995 | Kagawa et al. . |
| 5,409,787 | 4/1995 | Blanyer et al. . |
| 5,415,954 | 5/1995 | Gauthier et al. . |
| 5,422,200 | 6/1995 | Hope et al. . |
| 5,423,110 | 6/1995 | Gauthier et al. . |
| 5,438,249 | 8/1995 | Chang et al. . |
| 5,453,174 | 9/1995 | Van Anglen et al. . |
| 5,478,667 | 12/1995 | Shackle et al. . |
| 5,478,668 | 12/1995 | Gozdz et al. . |
| 5,479,083 | 12/1995 | Brainard . |
| 5,487,958 | 1/1996 | Tura . |
| 5,503,947 | 4/1996 | Kelly et al. . |
| 5,503,948 | 4/1996 | MacKay et al. . |
| 5,504,415 | 4/1996 | Podrazhansky et al. . |
| 5,519,563 | 5/1996 | Higashijima et al. . |
| 5,521,024 | 5/1996 | Sasaki et al. . |
| 5,528,122 | 6/1996 | Sullivan et al. . |
| 5,530,336 | 6/1996 | Eguchi et al. . |
| 5,532,087 | 7/1996 | Nerz et al. . |
| 5,547,775 | 8/1996 | Eguchi et al. . |
| 5,547,780 | 8/1996 | Kagawa et al. . |
| 5,548,200 | 8/1996 | Nor et al. . |
| 5,552,243 | 9/1996 | Klein . |
| 5,556,576 | 9/1996 | Kim et al. . |
| 5,561,380 | 10/1996 | Sway-Tin et al. . |
| 5,563,002 | 10/1996 | Harshe . |
| 5,567,539 | 10/1996 | Takahashi et al. . |
| 5,568,039 | 10/1996 | Fernandez . |
| 5,569,063 | 10/1996 | Morioka et al. . |
| 5,569,550 | 10/1996 | Garrett et al. . |
| 5,573,869 | 11/1996 | Hwang et al. . |
| 5,582,931 | 12/1996 | Kawakami . |
| 5,585,207 | 12/1996 | Wakabe et al. . |
| 5,589,290 | 12/1996 | Klink et al. . |
| 5,593,604 | 1/1997 | Beasley et al. . |
| 5,594,320 | 1/1997 | Pacholok et al. . |
| 5,595,835 | 1/1997 | Miyamoto et al. . |
| 5,595,839 | 1/1997 | Hossian . |
| 5,599,636 | 2/1997 | Braun . |
| 5,600,230 | 2/1997 | Dunstan . |
| 5,602,481 | 2/1997 | Fukuyama . |
| 5,610,495 | 3/1997 | Yee et al. . |
| 5,612,153 | 3/1997 | Moulton et al. . |
| 5,618,641 | 4/1997 | Arias . |
| 5,619,417 | 4/1997 | Kendall . |
| 5,620,808 | 4/1997 | Wheeler et al. . |
| 5,622,612 | 4/1997 | Mihara et al. . |
| 5,622,789 | 4/1997 | Young . |
| 5,623,196 | 4/1997 | Fernandez et al. . |
| 5,626,990 | 5/1997 | Miller et al. . |
| 5,631,537 | 5/1997 | Armstrong . |
| 5,633,573 | 5/1997 | van Phouc et al. . |
| 5,637,981 | 6/1997 | Nagai et al. . |
| 5,643,044 | 7/1997 | Lund . |
| 5,647,534 | 7/1997 | Kelz et al. . |
| 5,648,713 | 7/1997 | Mangez . |
| 5,650,240 | 7/1997 | Rogers . |
| 5,652,498 | 7/1997 | Edye et al. . |
| 5,652,502 | 7/1997 | van Phouc et al. . |
| 5,654,622 | 8/1997 | Toya et al. . |
| 5,670,272 | 9/1997 | Cheu et al. . |
| 5,804,335 * | 9/1998 | Kamauchi et al. .................. 429/218 |
| 5,824,432 | 10/1998 | Currle . |

FOREIGN PATENT DOCUMENTS

| | | |
|---|---|---|
| 42 25 746 A1 | 2/1994 | (DE) . |
| 94 15 874 | 12/1994 | (DE) . |
| 19618897 A1 | 11/1997 | (DE) . |
| 044 753 A1 | 1/1982 | (EP) . |
| 145 498 A2 | 6/1985 | (EP) . |
| 0 170 883 A1 | 2/1986 | (EP) . |
| 177 225 A1 | 4/1986 | (EP) . |

| | | | | | | |
|---|---|---|---|---|---|---|
| 0 225 767 A2 | 6/1987 | (EP) . | | 01320758 | 12/1989 | (JP) . |
| 244 683 A1 | 11/1987 | (EP) . | | 04294071 | 10/1992 | (JP) . |
| 310 075 A2 | 4/1989 | (EP) . | | 05166533 | 7/1993 | (JP) . |
| 336 102 A2 | 10/1989 | (EP) . | | 6-036756 | 2/1994 | (JP) . |
| 569 035 A1 | 11/1993 | (EP) . | | 6-203823 | 7/1994 | (JP) . |
| 570 590 A1 | 11/1993 | (EP) . | | 07250788 | 10/1995 | (JP) . |
| 584 639 A1 | 3/1994 | (EP) . | | 07282841 | 10/1995 | (JP) . |
| 643 429 A2 | 3/1995 | (EP) . | | 08115711 | 5/1996 | (JP) . |
| 652 620 A1 | 5/1995 | (EP) . | | 9-017416 | 1/1997 | (JP) . |
| 700 109 A1 | 3/1996 | (EP) . | | 1066-385 | 6/1986 | (SU) . |
| 0 721 247 A2 | 7/1996 | (EP) . | | WO 91/17451 | 11/1991 | (WO) . |
| 774 795 A2 | 5/1997 | (EP) . | | WO 92/02963 | 2/1992 | (WO) . |
| 780 920 A1 | 6/1997 | (EP) . | | WO 93/01624 | 1/1993 | (WO) . |
| 2 511 547 | 2/1983 | (FR) . | | WO 94/14206 | 6/1994 | (WO) . |
| 2 721 407 | 12/1995 | (FR) . | | WO 95/00978 | 1/1995 | (WO) . |
| 1582979 | 1/1981 | (GB) . | | WO 95/26055 | 9/1995 | (WO) . |
| 2 206 726 | 1/1989 | (GB) . | | WO 95/34824 | 12/1995 | (WO) . |
| 2 282 924 | 4/1995 | (GB) . | | WO 96/17397 | 6/1996 | (WO) . |
| 2295718 | 6/1996 | (GB) . | | WO 96/19816 | 6/1996 | (WO) . |
| 59-091658 | 5/1984 | (JP) . | | WO 96/22523 | 7/1996 | (WO) . |
| 59117061 | 7/1984 | (JP) . | | WO 98/11620 | 3/1998 | (WO) . |
| 61099278 | 5/1986 | (JP) . | | | | |
| 63062156 | 3/1988 | (JP) . | | | | |

\* cited by examiner

Fig. 7

APPARATUS AND METHOD FOR TREATING A CATHODE MATERIAL PROVIDED ON A THIN-FILM SUBSTRATE

GOVERNMENT LICENSE RIGHTS

The Government of the United States of America has rights in this invention pursuant to Cooperative Agreement No. DE-FC02-91CE50336 awarded by the U.S. Department of Energy.

FIELD OF THE INVENTION

This invention relates generally to energy storing devices, and more particularly, to an apparatus and method for treating a cathode material provided on a thin-film substrate.

BACKGROUND OF THE INVENTION

The demand for new and improved electronic and electromechanical systems has placed increased pressure on the manufacturers of energy storing devices to develop battery technologies that provide for high energy generation in a low-volume package. A number of advanced battery technologies have recently been developed, such as metal hydride (e.g., Ni-MH), lithiumion, and lithium polymer cell technologies, which would appear to provide the requisite level of energy production and safety margins for many commercial and consumer applications. Such advanced battery technologies, however, often exhibit characteristics that provide challenges for the manufacturers of advanced energy storage devices.

High-density, thin-film lithium batteries, for example, are typically fabricated using an anode comprising metallic lithium, lithium-metal alloy, lithium metal oxide or a lithium-carbon composite deposited on a substrate. In accordance with one battery configuration, the cathode comprises a metal oxide, typically a lithiated vanadium, or a modification of such an oxide, deposited on a metallic substrate. A solid polymer electrolyte film is typically situated between the active anode and cathode materials. Electrochemical cells, modules, and batteries may be fabricated using this basic anode/electrolyte/cathode thin-film laminate structure.

Manufacturers of high-density lithium batteries are currently faced with the challenge of producing reliable thin-film lithium cells within a high-volume manufacturing environment. A particular failure mechanism which has yet to be addressed and remedied in the prior art involves the instability of cell voltages which is often observed after forming thin-film electrochemical cells through use of a wrapping process. Another related failure mechanism involves the development of electrical shorts within the cells after completion of the wrapping process.

There is a need in the advanced battery manufacturing industry for a method and apparatus for fabricating high density, thin-film lithium cells and batteries which exhibit a reduced tendency for voltage instabilities and electrical shorts. The present invention fulfills these and other needs.

SUMMARY OF THE INVENTION

The present invention is directed to an apparatus and method for treating a cathode material provided on a surface of a thin-film substrate, and a treated thin-film cathode having increased smoothness. A web of untreated cathode material is moved between a feed mechanism and a take-up mechanism, and passed through a treatment station. The web of cathode material typically includes areas having surface defects, such as prominences extending from the surface of the cathode material. The surface of the cathode material is treated with an abrasive material to reduce the height of the prominences so as to increase an 85 degree gloss value of the material by at least approximately 10. The web of cathode material may be subjected to a subsequent abrasive treatment at the same or other treatment station. Burnishing or lapping film is employed at a treatment station to process the cathode material. An abrasive roller may alternatively be used to process the web of cathode material. The apparatus and method of the present invention may also be employed to treat the surface of a lithium anode foil so as to cleanse and reduce the roughness of the anode foil surface.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Figure 1A:
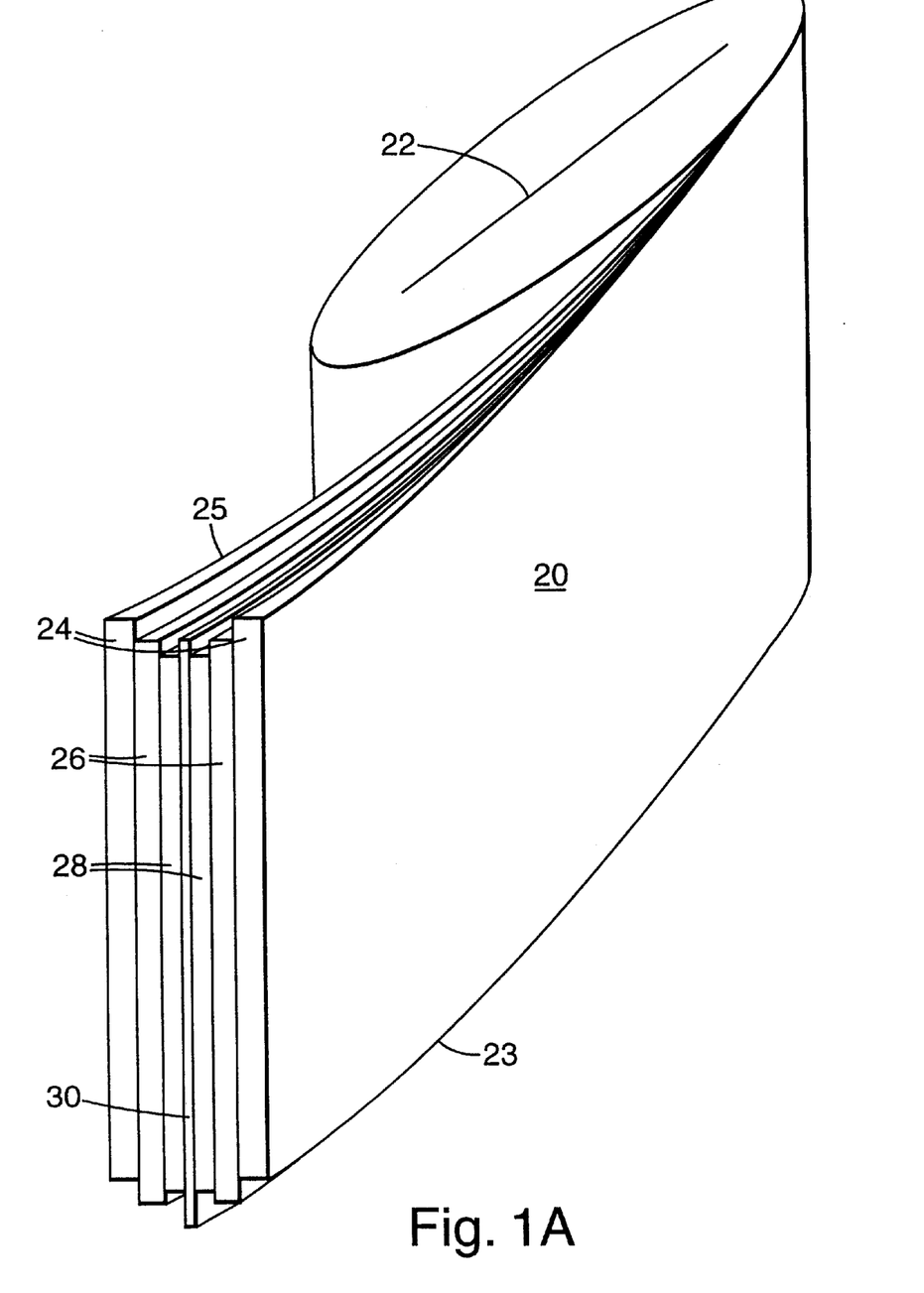
FIG. 1A illustrates an embodiment of a solid-state, thin-film electrochemical cell having a prismatic configuration.
Figure 1B:
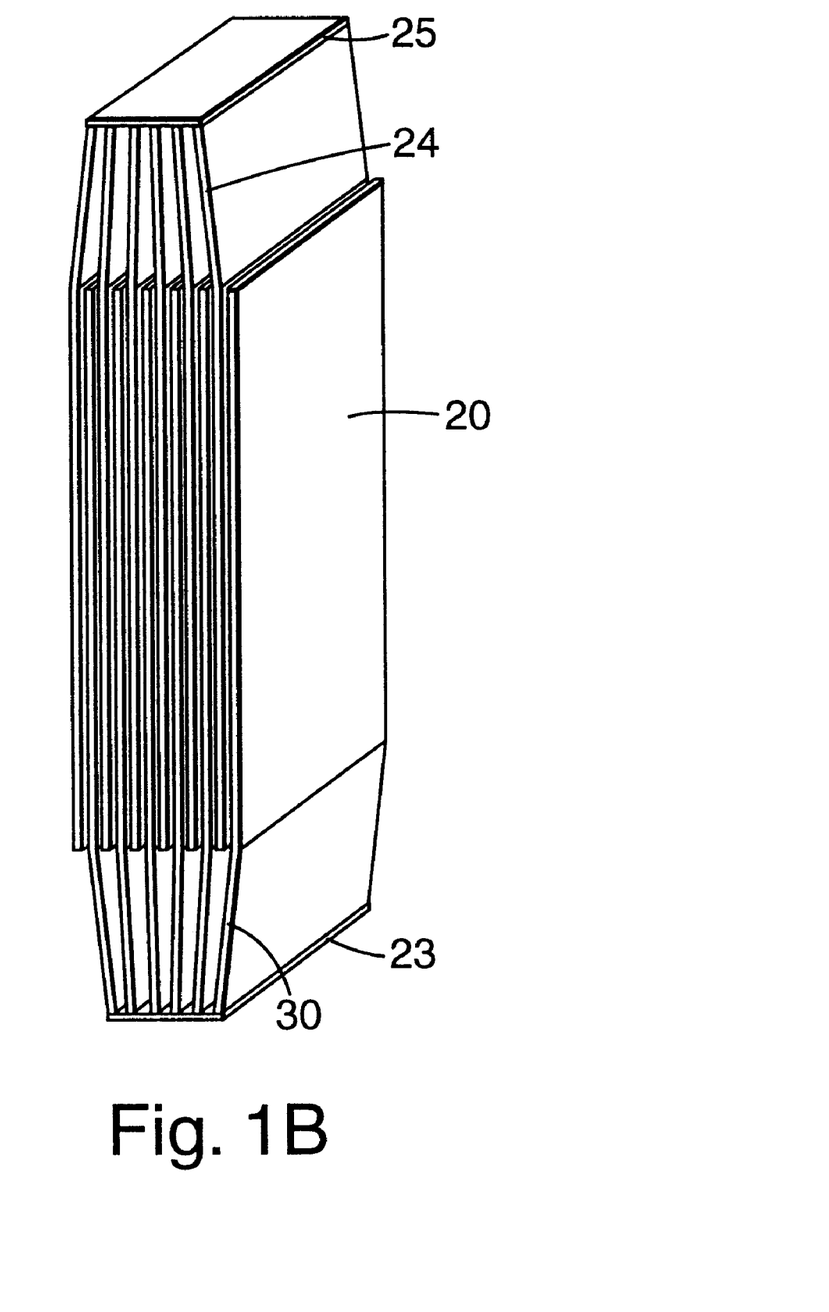
FIG. 1B is an illustration of another electrochemical cell embodiment having a prismatic configuration.

Referring to the drawings, and more particularly to FIGS,. 1A–1B, there is illustrated an embodiment of a solid-state, thin-film electrochemical cell which may be utilized in the fabrication of a rechargeable electrochemical generator in accordance with the principles of the present invention. The electrochemical cell 20 is shown as having a flat wound prismatic configuration in which a thin-film solid electrolyte 26 is disposed between a film 24 constituting an anode and a film 28 constituting a cathode.

A central cathode current collector film 30 is disposed between each of the cathode films 28. The anode films 24 are laterally offset relative to the cathode current collector 30 so as to expose the anode 24 along a first edge 25 of the cell 20, and to expose the cathode current collector 30 along a second edge 23 of the cell 20. The embodiment shown in FIGS. 1A–1B may include a core element 22, such as a foam or metal spring element, about which the thin-film electrochemical cell 20 is wound.

Figure 2A:
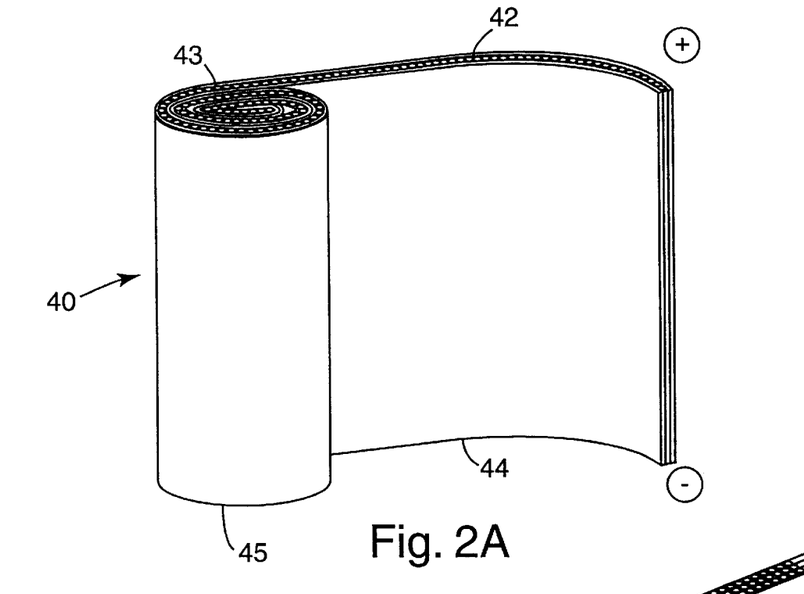
FIGS. 2A–2C illustrate various embodiments of a thin-film electrochemical cell.

In FIGS. 2A–2C, there is illustrated various embodiments of a thin-film electrochemical cell which may be used in the fabrication of a rechargeable energy storing device. As is shown in FIG. 2A, a thin-film electrochemical cell may be packaged in a "jelly roll" configuration so as to form a generally cylindrical cell structure in which a first edge 42 of the cell forms a positive contact 43, and a second edge 44 forms a negative contact 45. The positive and negative contacts 43, 45 are formed typically by use of a known metal spraying technique.

Figure 2B:
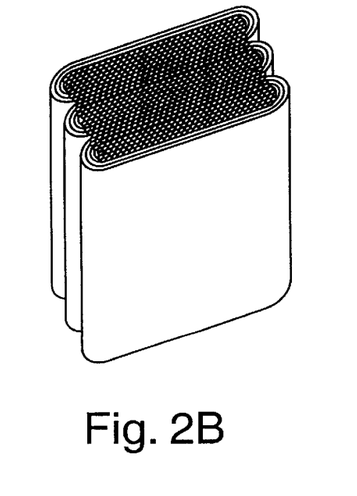
Figure 2C:
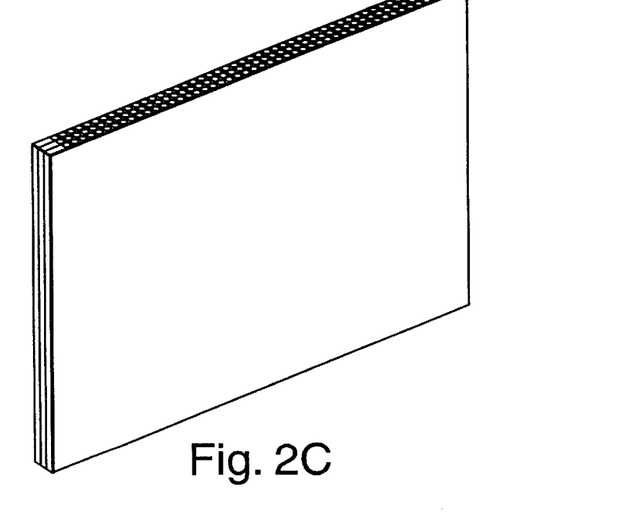

FIGS. 2B and 2C illustrate alternative packaging configurations for a thin-film rechargeable electrochemical cell. A flat roll configuration, shown in FIG. 2B, or a flat stack configuration, shown in FIG. 2C, provides for the aggregation of a relatively large thin-film cell surface area within a relatively small packaging configuration. Such geometries minimize voltage losses and allow for the efficient transfer of electrical energy to and from the multi-layered cell structure.

In accordance with one embodiment, and with further reference to FIGS. 1A–1B, the electrochemical cell 20 includes a solid polymer electrolyte 26 which constitutes an ion transporting material, a lithium metal anode 24, and an active vanadium oxide cathode 28. These film elements are fabricated to form a thin-film laminated prismatic structure, which may include an insulation film such as polypropylene film. A known metallization process is employed to form current collecting contacts along the edges 25, 23 of the anode 24 and cathode 28 films, respectively.

The cell shown in FIGS. 1A–1B, includes a central cathode current collector 30 which is disposed between each of the two cathode films 28 to form a bi-face cell configuration. A mono-face cell configuration may alternatively be employed in which a single cathode collector 30 is associated with a single anode/electrolyte/cathode element combination. In this configuration, an insulating film is typically disposed between individual anode/electrolyte/cathode/collector element combinations. The various components of the electrochemical cells depicted generally in the figures may be fabricated and packaged in accordance with the methodologies disclosed in U.S. Pat. Nos. 5,423,110, 5,415,954, and 4,897,917, the contents of which is incorporated herein by reference.

Figure 4:
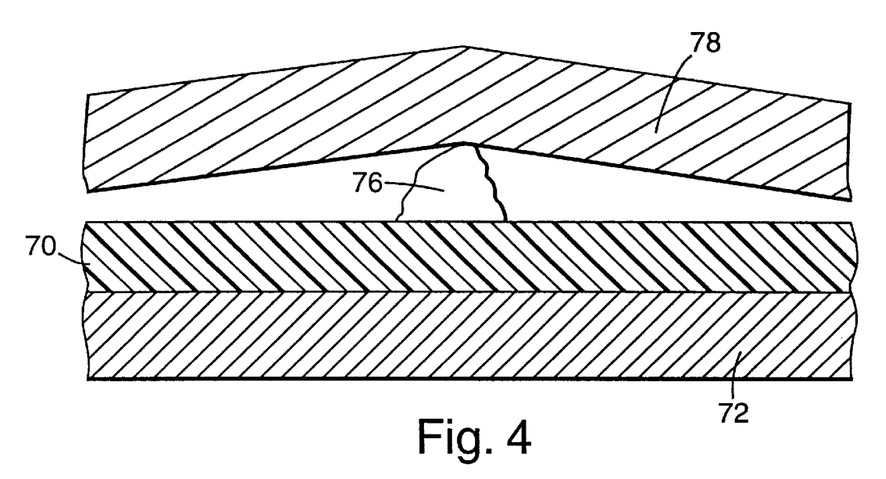
FIG. 4 is a depiction of a cathode coating provided on a thin-film substrate which has experienced tenting due to entrapment of a surface defect between the cathode coating and an electrolyte material layer.

In general, it has been observed that coated cathode films of lithium polymer batteries are subject to certain types of failure, depending on the particular method of preparation. It has been found that the presence of particulate defects, agglomerates, and other surface irregularities of the cathode coating typically results in a significant decrease in electrical performance of an electrochemical cell, which often leads to catastrophic failure of the cell. FIG. 4, for example, illustrates a phenomenon termed "tenting" which, if left unaddressed, often leads to a progressive reduction in electrochemical generator performance.

Figure 3:
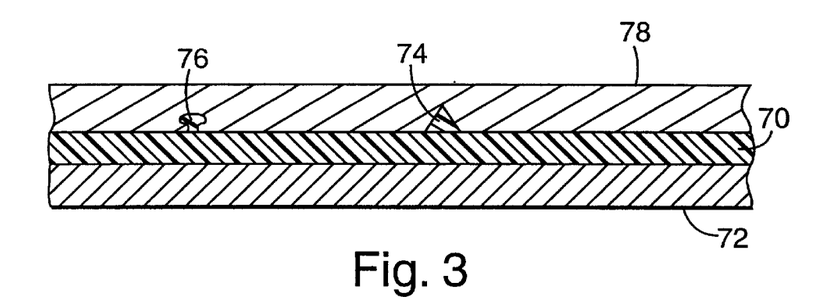
FIG. 3 is a depiction of a cathode coating provided on a thin-film substrate, with two surface defects shown entrapped between the cathode coating and an electrolyte material layer.

Turning to FIG. 3, there is depicted a cathode coating 70 provided on a substrate 72, such as a continuous thin-film metallic web. During a typical cathode coating process, surface defects and other irregularities may develop or otherwise be deposited on the cathode coating 70. A protrusion of cathode material 74, for example, or other surface defect 76, such as a particulate contaminant, may result in tenting at the solid polymer electrolyte and the cathode coating interface. Tenting may also occur by entrapment of air during lamination of the solid polymer electrolyte 78 onto the cathode coating 70.

A location of the cathode coating 70 which is subject to tenting generally experiences increased interfacial resistance, and defects penetrating into the laminated electrolyte effectively thin the electrolyte layer. Such locations are particularly susceptible to dendrite formation and mechanical/electrical failure.

As is best shown in FIG. 3, a defect 76 on the surface of the cathode coating 70 protrudes into the solid polymer electrolyte layer 78 which is typically applied to the cathode coating 70. Such defects, if sufficient in height or size, have been identified as a primary contributor to dendrite growth and buildup. Such defects 76 have also been identified as a primary contributor to electrical shorting which often renders an electrochemical cell either unreliable or non-functional for its intended purpose.

The deleterious effects resulting from defect entrapment and tenting as discussed above are significantly reduced in impact, or altogether eliminated, by employment of a treatment methodology in accordance with the principles of the present invention. It has been determined by the inventors that abrasively treating the cathode coating 70 to a degree sufficient to decrease the size and/or number of surface formations and defects on the cathode coating 70 significantly reduces incidences of tenting, which results in a concomitant reduction in electrical shorts within the electrochemical cell and improved electrochemical performance.

In order to achieve these and other desirable results, the cathode coating 70 should be treated in a manner which reduces the impact of surface defect presence, yet does not adversely disturb the cathode coating and binder matrix. For example, the cathode coating 70 is typically, but not necessarily, processed in an uncured state. As such, the binder remains relatively soft which tends to complicate the treatment procedure. A typical thin-film cathode coating, for example, comprises approximately 63% by weight of oxide, 3% by weight of conductive carbon, and 34% by weight of binder. In terms of volume, each of the oxide and binder materials constitutes about 50% of the coating volume.

In this configuration, the melting point of the cathode material/binder coating may be approximately 45° Celsius (C). Elevating a process temperature above the 45° C. melting point typically results in flowing of the binder material, which causes undesirable sticking and other process complications. It has been found that the selection of binder material has a greater impact on the burnishing characteristics of the cathode coating matrix than does the selection of the oxide material.

Various characteristics of a treated cathode coating 70 may be monitored to determine the extent and sufficiency of the treatment procedure. One such characteristic is the gloss of the cathode coating 70 prior to and after treatment. In accordance with one embodiment, improved cathode coating performance and characteristics area realizable when an 85 degree gloss reading of the cathode material after treatment is increased by approximately 10.

It is noted that the 85 degree gloss reading measurement is a standard procedure by which the roughness of a film may be determined. In general, a cathode coating 70 will be considered sufficiently "treated" in accordance with the principles of the present invention if the 85 degree gloss reading of the cathode material after treatment is increased by approximately 10. In some applications, it may be desirable that cathode film coatings for use in lithium batteries be treated to increase an 85 degree gloss reading by at least 20, and in other applications, by at least 40.

Table 1 below provides 85 degree gloss values obtained from a cathode coating prior to and after a treatment procedure in accordance with the principles of the present invention. The data associated with the First Treatment was obtained by treating a cathode coating sample at a single treatment station. The data associated with the Second Treatment was obtained by treating a cathode coating sample at a first treatment station, and subsequently treating the sample at a second treatment station.

TABLE 1

85 Degree Gloss Readings
(dimensionless)

| Reading | Initial Pre-Treatment Values | First Treatment | Second Treatment | Stationary Spot |
|---|---|---|---|---|
| 1 | 12.90 | 31.80 | 46.20 | 58.50 |
| 2 | 12.80 | 26.00 | 39.10 | 53.10 |
| 3 | 12.60 | 21.50 | 36.70 | 53.80 |
| 4 | 12.00 | 23.30 | 28.70 | 52.40 |
| 5 | 13.30 | 21.30 | 26.30 | 47.60 |
| Average | 12.72 | 24.78 | 35.40 | 53.08 |
| Std. Dev. | 0.48 | 4.35 | 8.06 | 3.89 |

Five 85 degree gloss readings were taken at different locations of the cathode material prior to performing a burnishing or lapping procedure associated with the First and Second Treatments. The average 85 degree gloss value was 12.72 with a standard deviation of 0.48. Five separate 85 degree gloss readings were taken at different locations of the cathode material sample after the material had been treated with 5 micron lapping film during the First Treatment. The gloss readings for the First Treatment averaged at 24.78, with a standard deviation of 4.35.

The Second Treatment procedure involved burnishing the cathode material with 5 micron lapping film at a first treatment station, followed by a subsequent burnishing treatment using 2 micron lapping film at a second treatment station. Five separate 85 degree gloss readings were taken at separate locations of the cathode material sample, with the average 85 degree gloss value averaging at 35.40 and a standard deviation of 8.06. For purposes of comparison, burnishing was conducted on a section of the cathode material web that was not moving at the time of burnishing. The stationary cathode material sample was burnished using 5 micron lapping film for a duration of approximately 5 minutes. Five 85 degree gloss readings were taken from different locations of the stationary web which averaged 53.08, with a standard deviation of 3.89.

It was apparent that the lapping or burnishing technique yielded an increased smoothness or gloss to the cathode coated film. In general, experiments evaluating electrochemical cell performance have demonstrated that burnished cathode films, such as that indicated by higher 85 degree gloss readings, operate with a lower incidence of failure due to shorts, dendrite formation or other similar problems than did previously prepared cathode films constructed of similar materials but manufactured without the lapping or burnishing treatment.

Another characteristic of the cathode coating which may be monitored to determine the sufficiency of a treatment procedure is the frequency of large and small defects populating the surface of the cathode coating 70. The data provided in Table 2 was obtained using a laser inspection system. The two cathode coatings utilized in this experiment had significantly different coating qualities. The cathode coatings were scanned using the laser system before and after burnishing.

The system scanned the cathode material surface and measured the frequency and size of coating defects. Signal processing was used to count the number of surface defects falling within two size categories, namely, large and small.

TABLE 2

| | Roll A Small Defects (Counts per Decimeter) | Roll A Large Defects (Counts per Decimeter) | Roll E Small Defects (Counts per Decimeter) | Roll E Large Defects (Counts per Decimeter) |
|---|---|---|---|---|
| Before Burnishing | 3.8 | 1.0 | 7.2 | 3.9 |
| After Burnishing | 0.4 | 0.2 | 1.6 | 0.6 |

The data provided in Table 2 indicates that burnishing the cathode coating in accordance with the principles of the present invention reduces the frequency of both large and small surface defects by a factor of approximately 4.5 to 9.5. The average defect frequencies, measured in terms of counts per decimeter, for the several cases are tabulated in Table 3 below.

TABLE 3

| | Small Defect Frequency (Counts per Decimeter) | | | Large Defect Frequency (Counts per Decimeter) | | |
|---|---|---|---|---|---|---|
| | Mean | Std. Dev. | Max | Mean | Std. Dev. | Max |
| Sample #1-Roll A Before Burnishing | 3.8 | 2.5 | 16.0 | 1.0 | 1.2 | 9.0 |
| Sample #2-Roll A After Burnishing | 0.4 | 0.7 | 4.0 | 0.2 | 0.5 | 4.0 |
| Sample #3-Roll E Before Burnishing | 7.2 | 6.3 | 46.0 | 3.9 | 3.9 | 29.0 |
| Sample #4-Roll E After Burnishing | 1.6 | 2.4 | 24.0 | 0.6 | 1.0 | 8.0 |

Sections of the cathode coatings from Rolls A and E were removed and measured using a Wyko interferometer before and after burnishing. The interferometer produces three-dimensional images of 1 millimeter (mm) by 1 mm sections of the coating surface, and characterizes the z-direction dimension of surface features. One output of the interferometer is the Rt value, which represents the difference between a maximum and a minimum height observed in the sample as measured in microns. Another output of the instrument is the root mean square value of the roughness measured in microns, which is represented by the term Rq. Defects noticeable by the naked eye were analyzed. Areas with no defects were analyzed for purposes of comparison. Subgroup sizes of 6 to 12 samples were used.

Tables 4 and 5 below provide interferometer data obtained using samples #1–#4 of the cathode material from each of Rolls A and E which were also subjected to laser system testing as is tabulated above in Table 3.

TABLE 4

|  | Areas including defects (all units in microns) | | | | Defect Free Areas | |
| --- | --- | --- | --- | --- | --- | --- |
|  | Roll A | Roll A | Roll E | Roll E | Both Rolls | |
|  | Rt | Rq | Rt | Rq | Rt | Rq |
| Before Burnishing | 30.6 | 5.6 | 64.9 | 12.1 | 11.7 | 1.0 |
| After Burnishing | 15.5 | 2.1 | 28.5 | 4.0 | 9.9 | 0.9 |

The data obtained from the defect free areas of the cathode coating indicates the magnitude of surface non-uniformity which impacts the values of Rt and Rq obtained from areas having defects. For example, the areas including defects for the Roll A cathode material produced an Rt value of 30.6 prior to burnishing. When considering the Rt value of 11.7 as an offset, the actual height of the defects detected on the Roll A sample is approximately 19 microns (i.e., 30.6–11.7 microns). The actual height of these defects after application of the burnishing treatment is reduced to approximately 6 microns (i.e., 15.5–9.9 microns). The actual height values for defects detected on the Roll E sample before and after application of the burnishing treatment are approximately 53 microns (i.e., 64.9–11.7 microns) and 19 microns (i.e., 28.5–9.9 microns), respectively.

TABLE 5

|  | Areas with Defects (in microns) | | | Areas without Defects (in microns) | | |
| --- | --- | --- | --- | --- | --- | --- |
|  | Rq | Ra | Rt | Rq | Ra | Rt |
| Sample #1-Roll A Before Burnishing | | | | | | |
| Mean | 12.1 | 9.7 | 84.9 | 1.0 | 0.8 | 10.9 |
| Std. dev. | 6.1 | 5.5 | 21.4 | 0.0 | 0.0 | 1.4 |
| Sample #2-Roll A After Burnishing | | | | | | |
| Mean | 4.0 | 3.2 | 28.5 | 1.0 | 0.8 | 8.8 |
| Std. dev. | 2.5 | 2.1 | 13. | 0.1 | 0.1 | 1.0 |
| Sample #3-Roll E Before Burnishing | | | | | | |
| Mean | 5.6 | 4.1 | 30.6 | 1.1 | 0.9 | 12.6 |
| Std. dev. | 3.1 | 3.0 | 10.0 | 0.1 | 0.1 | 3.0 |
| Sample #4-Roll E After Burnishing | | | | | | |
| Means | 2.1 | 1.7 | 15.5 | 0.8 | 0.7 | 10.9 |
| Std. dev. | 1.0 | 1.0 | 7.2 | 0.1 | 0.1 | 2.3 |

The data provided in Tables 4 and 5 demonstrates that burnishing reduced the height of surface defects in both sets of cathode coating samples. For example, the height, Rt, of surface defects for the cathode material developed on Rolls A and E were reduced by a factor of approximately 2, respectively. The root mean square data, Rq, indicates that the roughness of the coating surface was reduced by a factor of approximately 3 for the material coatings of Rolls A and E, respectively. Areas of the cathode material samples which were observed as being free of defects experienced little change in terms of observed height and roughness. It is noted that the term $R_A$ represents the roughness average which corresponds to the mean height over the sample.

In general, experiments evaluating electrochemical cell performance using treated films of cathode material have revealed that a typical surface defect is hemispherical in shape, and can have a height of up to 50 microns. Depending on a particular application, the thickness of the solid electrolyte layer 78 may range between 1 to 100 microns. Electrolyte layers having a thickness of between 10 and 30 microns are typically employed. It has been determined that reducing the size of defects on the cathode surface results in a proportional reduction in incidences of electrical shorting and cell voltage instabilities.

It is noted that a known calendering process is often used when a densified electrode/cathode is desired. Although calendering tends to reduce the size of larger surface defects, it has been observed that increasing calendering pressures within a reasonable range of operation does not sufficiently reduce the size and frequency of surface defects on the cathode coated film. It is also noted that increasing lamination pressures within a reasonable range of operation are insufficient to reduce the size of surface defects and the resultant tenting effect. Treating the cathode material in a manner consistent with the principles of the present invention, however, may obviate the need to perform a calendering procedure, and may also provide an opportunity to reduce lamination pressures.

Treating the entire surface of the cathode material provides for improved surface uniformity and reduced dendrite growth. Although a first treatment may sufficiently remove large surface defects, it may be desirable to further treat the cathode material surface in order to achieve increased surface smoothness.

It has been observed that voltage fluctuations and voltage drops within electrochemical cells developed using thin cathode coated films are typically associated with the presence of local defects formed or otherwise disposed on the face of the cathode coating. Various catastrophic failure modes, such as electrical shorts, are also associated with these surface defects. The data provided in Table 6 demonstrates that a burnishing procedure in accordance with the principles of the present invention provides for the production of electrochemical cells having stable initial voltages, indicating a reduction in the size and number of surface defects.

TABLE 6

| Burnishing Employed | |
| --- | --- |
| Sample | Initial Voltage (Volts) |
| 1 | 3.590 |
| 2 | 3.588 |
| 3 | 3.589 |
| 4 | 3.588 |
| 5 | 3.589 |
| 6 | 3.590 |

TABLE 6-continued

Burnishing Employed

| Sample | Initial Voltage (Volts) |
|---|---|
| 7 | 3.589 |
| 8 | 3.590 |
| 9 | 3.589 |
| 10 | 3.589 |
| 11 | 3.587 |
| 12 | 3.586 |
| 13 | 3.586 |
| 14 | 3.587 |
| 15 | 3.586 |

The data provided in Table 7, in contrast to that of Table 6, demonstrates that a high degree of voltage instability typically occurs within a population of electrochemical cells in which the cathode coated films used to produce such cells are not subjected to the burnishing or lapping procedure. The data of Table 6 was obtained using 15 thin-film lithium polymer electrochemical cells having a cylindrical configuration.

TABLE 7

Burnishing Not Employed

| Sample | Initial Voltage (Volts) |
|---|---|
| 1 | 3.549 |
| 2 | 3.390 |
| 3 | 3.571 |
| 4 | 3.423 |
| 5 | 3.454 |

The initial voltages of electrochemical cells constructed from cathode coated thin-films which were subjected to burnishing ranged between 3.590 V and 3.586 V. This variation in cell voltage corresponds to a voltage instability on the order of 0.1%. The data provided in Table 7 was obtained using five lithium polymer electrochemical cells having a cylindrical cross-section.

It can be seen that fabricating electrochemical cells using non-burnished cathode films results in cells that experience significantly greater voltage variations. For example, the initial voltage values provided in Table 7 indicate cell voltage instability on the order of 5%, which is significantly larger than the 0.1% voltage fluctuation observed in cells having burnished cathode film layers.

Figure 5:
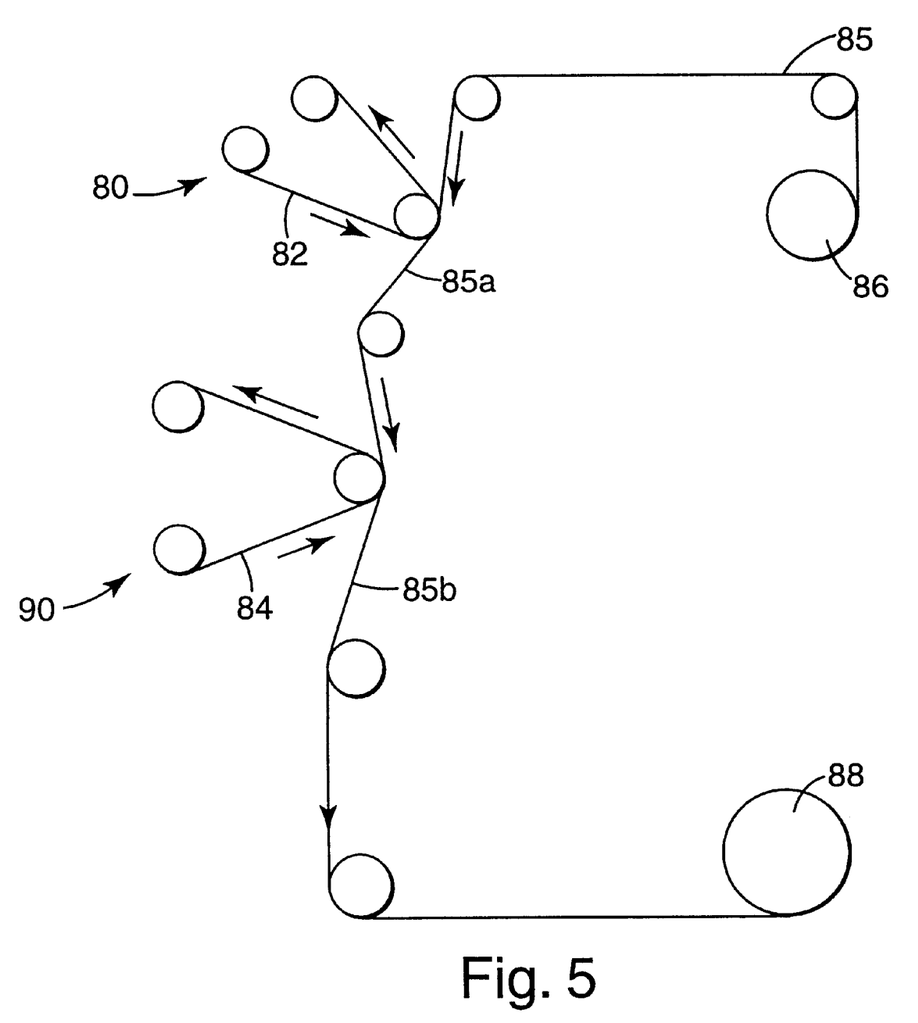
FIG. 5 illustrates an apparatus for treating a cathode material or an anode material provided on a continuous thin-film substrate in accordance with an embodiment of the present invention.

An embodiment of an apparatus for treating a cathode material provided on a surface of a continuous thin-film substrate is illustrated in FIG. 5. In accordance with this embodiment, a coated cathode laminate 85 is shown being unwound from a feed roll 86. It is understood that the cathode laminate, comprising a cathode coating on a continuous substrate, is untreated within the context of the present invention when it is initially unwound from the feed roll 86. The cathode laminate 85 is transferred to a treatment station 80 where it is treated by an abrasive material 82. The cathode laminate 85a may then pass through a second, optional treatment station 90 where it is further treated by use of an abrasive material 84. The treated coated cathode laminate 85b is directed to take-up roll 88.

In one embodiment, the abrasive material 82, 84 which is used to treat the coated cathode laminate 85 constitutes moving webs of abrasive material, such as lapping films or burnishing films. The lapping or burnishing films 82, 84 employed at treatment stations 80, 90 move in a direction generally opposite to that of the cathode laminate web 85. It is noted that the burnishing or lapping technique typically removes smaller defects, while larger defects are truncated.

The films utilized for the burnishing or lapping operations at treatment stations 80, 90 are typically conventional lapping or burnishing films. In one embodiment, 10 micron or less lapping films are used. In this context, the term "10 micron or less" represents the average size or grade of the abrasive particles on the lapping film. Typically, 9 micron or smaller lapping films are used.

In some applications, in which two abrasive treatments are conducted, it may be desirable to use different sizes or grades of lapping films. For example, a 5 to 10 micron lapping film may be used for an initial abrasion treatment at treatment station 80, with a follow-up treatment using a 2 micron lapping film at treatment station 90. A lapping film suitable for this application is 3M 461X manufactured by Minnesota Mining and Manufacturing Company. Other suitable lapping films may be fabricated from aluminum oxide, silicon carbide, or chrome oxide materials, for example.

Figure 6:
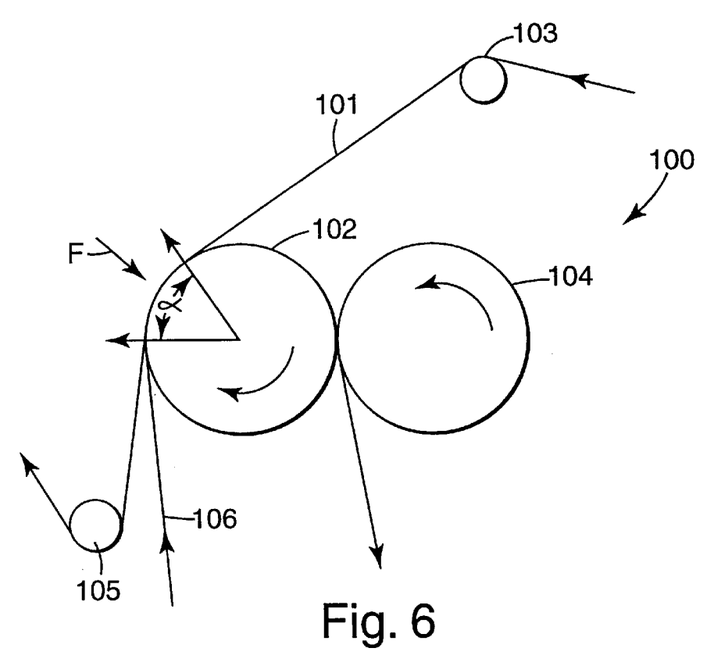
FIG. 6 is a more detailed illustration of an apparatus for treating a cathode material or an anode material provided on a continuous thin-film substrate in accordance with another embodiment of the present invention.

Turning now to FIG. 6, there is illustrated a more detailed embodiment of an apparatus for treating a thin-film substrate having a cathode material provided thereon through use of an abrasive material. In accordance with this embodiment, a web 101 of cathode material is transported through the treatment station 100 so that the web 101 contacts a treatment roller 102. Depending on the orientation of idlers 103, 105, a contact angle α may be varied to increase or decrease the amount of product roller surface area that comes into contact with the product web 101. In one embodiment, the contact angle α represents an angle of approximately 80°. In accordance with another embodiment, the contact angle may be varied between an angle less than 80° and up to an angle of approximately 160° by appropriate placement of the idlers 103, 105.

A lapping or burnishing film 106 passes over the treatment roller 102 and is driven at a rate, $R_{Abrasive}$, by a drive roller 104. The drive roller 104 is typically fabricated from rubber, and the treatment roller 102 is typically constructed from steel or other metallic material. The product web 101 contacts the abrasive film 106 along the surface of the treatment roller 102 defined by the contact angle α. Idlers 103, 105, in addition to other components, force the product web 101 against the treatment roller 102 and hence the abrasive film 106.

Several important parameters that impact the efficacy of the cathode material treatment procedure include the tension in the product web 101 and in the abrasive film 106, the contact angle α, the rate, $R_{Product}$, of the product web 101 passing through the treatment station 100, the force, F, produced to maintain contact between the product web 101 and the abrasive film 106, and the length of time during which the product web 101 is in contact with the treatment roller 102.

In one embodiment, the product web 101 passes over the treatment roller 102 at a rate of approximately 10 meters per minute (m/m). The abrasive film 106 moves at a rate of approximately 0.3 m/m and in a direction opposite to that of the product web 101. In this embodiment, the tension in the product web 101 is held to approximately 5 kg for a product web having a width of 150 mm. The tension in the abrasive film 106 is approximately 5 kg for an abrasive film having a width of approximately 150 mm. It is noted that the data provided in Tables 2–7 was obtained using the above-described film tensions and rates using 9 micron lapping film for two process passes.

It is noted that the speed of the product web 101 and that of the abrasive film 106 may be varied from the values specified above. By way of example, the First Treatment data provided in Table 1 above was obtained from a product web 101 which was treated at a speed of approximately 11 m/m using 5 micron lapping film moving at a speed of approximately 1 m/m. By way of further example, the Second Treatment data of Table 1 was obtained from a product web 101 moving at a speed of approximately 11 m/m which was treated at a first treatment station using 5 micron lapping film moving at a speed of approximately 1 m/m, and subsequently treated with 2 micron lapping film moving at a speed of approximately 0.9 m/m at a second treatment station.

In an embodiment in which cathode material is deposited on both sides of a thin-film substrate, such as in a bi-face configured electrochemical cell, a first side may be processed for the entire product roll, and then repeated for the opposite side of the product roll. In another embodiment, two treatment stations may be situated on either sides of the product web 101 to treat both sides of the product web 101 in a single pass.

Typically, a sufficient degree of burnishing may be accomplished using a 9 or 10 micron burnishing or lapping film 106 in a single pass of the product web 101. Visual inspection of the treated product web 101 may reveal that additional treatment may be required. In such cases, a second or third pass may be necessary using a more aggressive abrasive, such as 30 or 60 micron lapping or burnishing films.

Figure 7:
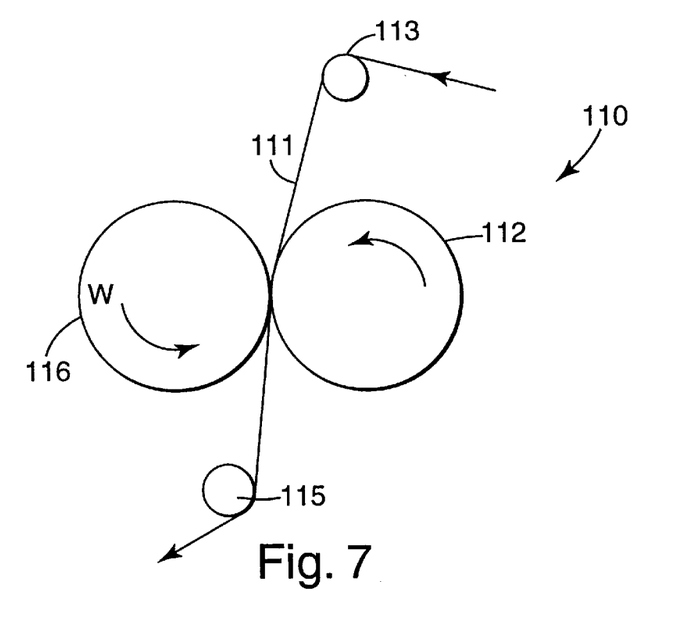
FIG. 7 is an illustration of another embodiment of an apparatus for treating a cathode material or an anode material provided on a continuous thin-film substrate.

In accordance with another embodiment, and as illustrated in FIG. 7, a cathode material product web 111 is passed through a treatment station 110 which includes a product roller 112 which forces the product web 111 against an abrasion roller 116. The speed of the abrasion roller 116, the force exerted on the product web 111 by the abrasion and product rollers 116, 112, the rate of the product web 111 through the treatment station 110, and the type of abrasive used may be varied to burnish the cathode material to a sufficient degree as described hereinabove. It is noted that occasional cleansing of the abrasion roller 116 is typically required. In one embodiment, the abrasion roller 116 may be rotated at a surface rate of 10 m/m and the product web may be moved at a rate of 1 m/m.

Although the advantages of the present invention have been described hereinabove specifically with respect to cathode oxide materials deposited on thin-film substrates, the general burnishing process has been demonstrated to be efficacious on other cathode material structures. As such, the present invention is not restricted to use only with oxide materials deposited on a continuous thin-film substrate.

By way of further example, the principles of the present invention may be applied in the processing of lithium foil or films during a cleansing procedure. In particular, lithium films which are fabricated for use in thin-film lithium polymer batteries typically have a passivation layer. The burnishing technique described herein may be used to cleanse a lithium anode foil and to reduce surface roughness of lithium anode foil. In particular, the burnishing technique disclosed herein may be used to remove the passivation layer prior to electrochemical cell assembly. A reduction in surface roughness to on the order of 1 to 2 microns of smoothness, for example, improves attachment of the lithium anode foil to the solid electrolyte and can reduce the rate of dendrite formation.

The foregoing description of the various embodiments of the invention has been presented for the purposes of illustration and description. It is not intended to be exhaustive or to limit the invention to the precise form disclosed. Many modifications and variations are possible in light of the above teaching. For example, burnishing a product web or foil may be accomplished by moving an abrasive material in a cross-web direction or a direction other than opposite to that of the product web or foil as it passes through a treatment station. It is intended that the scope of the invention be limited not by this detailed description, but rather by the claims appended hereto.

What we claim is:

1. A thin-film cathode prepared by a process comprising:
   providing a thin-film substrate having a coating of cathode material disposed thereon, the cathode material comprising an oxide, conductive carbon, and a binder, some of the cathode material including defects protruding from a surface of the cathode material;
   moving the thin-film substrate between a feed mechanism and a take-up mechanism; and
   treating the cathode material surface at a treatment station with an abrasive material to reduce a height of the defects, the cathode material surface of the thin-film cathode having an 85 degree gloss value of at least about 22.

2. The cathode of claim 1, wherein treating the cathode material surface further comprises moving a film of the abrasive material in a direction substantially opposite to a direction in which the thin-film substrate passes through the treatment station.

3. The cathode of claims 2, wherein the film of the abrasive material comprises abrasive particles ranging in size between approximately 2 to 60 microns.

4. The cathode of claim 1, wherein treating the cathode material surface further comprises moving a roller provided with the abrasive material against the cathode material surface, the roller moving in a direction substantially opposite to a direction in which the thin-film substrate passes through the treatment station.

5. The cathode of claim 1, wherein treating the cathode material surface further comprises:
   treating the cathode material surface at a first treatment station with a first abrasive material of a first grade; and
   treating the cathode material surface at a second treatment station with a second abrasive material of a second grade.

6. The cathode of claim 1, wherein treating the cathode material surface further comprises:
   treating a surface of the cathode material provided on a first side of the thin-film substrate at a first treatment station; and
   treating a surface of the cathode material provided on a second side of the thin-film substrate at a second treatment station.

7. The cathode of claim 1, wherein the height of the defects protruding from the cathode material surface is reduced in height to a height no greater than approximately 10 microns.

8. The cathode of claim 1, wherein the height of the defects protruding from the cathode material surface is reduced to a height which is less than a thickness of an electrolyte layer to be provided on the cathode material surface.

9. The cathode of claim 1, wherein the cathode material surface of the thin-film cathode has an 85 degree gloss value of at least about 30.

10. The cathode of claim 1, wherein the cathode material surface of the thin-film cathode has an 85 degree gloss value of at least about 40.

11. A thin-film cathode prepared by a process comprising:

providing a thin-film substrate having a coating of cathode material disposed thereon, the cathode material comprising an oxide, conductive carbon, and a binder, some of the cathode material including defects protruding from a surface of the cathode material;

moving the thin-film substrate between a feed mechanism and a take-up mechanism; and treating the cathode material surface at a treatment station with an abrasive material to reduce a height of the defects, the cathode material surface of the thin-film cathode being substantially free of defects having heights of greater than about 19 microns.

12. The cathode of claim 11, wherein the cathode material surface of the thin-film cathode is substantially free of defects having heights of greater than about 10 microns.

13. The cathode of claim 11, wherein the cathode material surface of the thin-film cathode is substantially free of defects having heights of greater than about 6 microns.

14. The cathode of claim 11, wherein the height of the defects protruding from the cathode material surface is reduced to a height which is less than a thickness of an electrolyte layer to be provided on the cathode material surface.

* * * * *

UNITED STATES PATENT AND TRADEMARK OFFICE
CERTIFICATE OF CORRECTION

PATENT NO. : 6,235,425 B1  
DATED : May 22, 2001  
INVENTOR(S) : Hanson et al.

It is certified that error appears in the above-identified patent and that said Letters Patent is hereby corrected as shown below:

<u>Title page,</u>
Item [73], Assignees, add -- Canada -- after "Montreal";
Item [56], FOREIGN PATENT DOCUMENTS, add -- 59139555, 8/94, Japan --;

<u>Column 2,</u>
Line 37, add a return after "layer;" and indent "Fig. 5..." which would then be on the next line;

<u>Column 8,</u>
Line 47, replace "face" with -- surface --;

Signed and Sealed this

Twenty-seventh Day of August, 2002

Attest:

JAMES E. ROGAN
Attesting Officer *Director of the United States Patent and Trademark Office*